(Model.)
J. H. NORTHROP.
STOP MOTION DEVICE FOR SPOOLING MACHINES.
No. 295,503.  Patented Mar. 18, 1884.
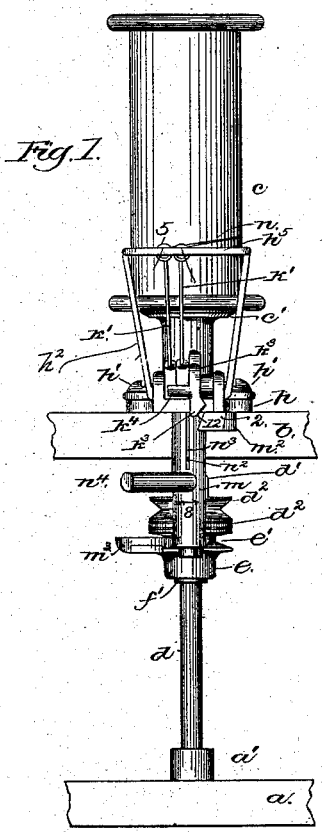
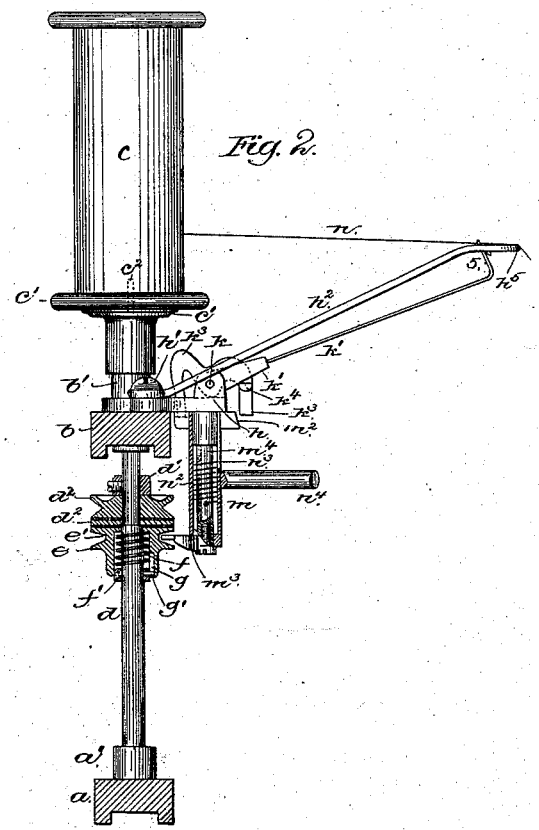
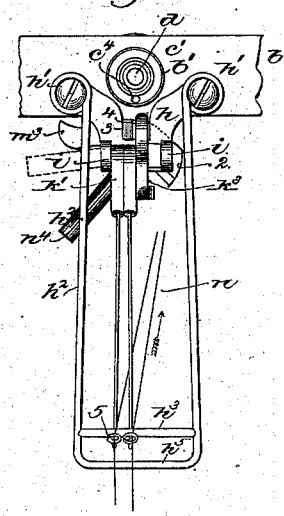
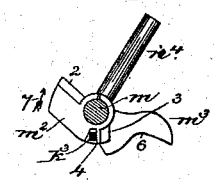
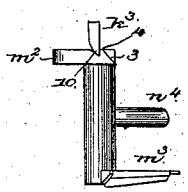
Witnesses.
John F. C. Prinkert
Fred H. Powell
Inventor,
James H. Northrop.
By Crosby & Gregory attys.

UNITED STATES PATENT OFFICE.

JAMES H. NORTHROP, OF HOPEDALE, MASSACHUSETTS, ASSIGNOR OF ONE-HALF TO THE HOPEDALE MACHINE COMPANY, OF SAME PLACE.

STOP-MOTION DEVICE FOR SPOOLING-MACHINES.

SPECIFICATION forming part of Letters Patent No. 295,503, dated March 18, 1884.

Application filed May 19, 1883. (Model.)

*To all whom it may concern:*

Be it known that I, JAMES H. NORTHROP, of Hopedale, county of Worcester, State of Massachusetts, have invented an Improvement in Stop-Motion Devices for Spooling-Machines, of which the following description, in connection with the accompanying drawings, is a specification, like letters on the drawings representing like parts.

In spooling-machines wherein two or more threads are to be wound upon a spool it is very necessary that the spindle be stopped very quickly whenever a thread breaks, so as to prevent the broken end from being wound upon the spindle, and also so as to leave a projecting end long enough to be readily tied. Various devices have been used for this purpose.

This invention has for its object to simplify the construction of the mechanism between the drop levers or wires and the spindle of a spooling-machine, whereby the spindle may be instantly stopped when one of the threads being wound upon the spool carried by the spindle breaks.

The invention consists in the combinations of devices hereinafter particularly set forth and claimed.

Figure 1 is a partial front elevation of a sufficient portion of a spooling-machine to illustrate a practical embodiment of my invention; Fig. 2, a side elevation and partial section of Fig. 1; Fig. 3, a top view of Fig. 1, with the spool-driving disk removed. Fig. 4 is a side view of the brake, a portion of the latch being broken away; and Fig. 5, a top view of Fig. 4.

The step-rail $a$, bolster-rail $b$, step $a'$, bolster $b'$, spool $c$, and spindle $d$ are and may be all as usual. The spindle has a spool-driving disk or head, $c'$, which is provided with a pin, $c^2$, (see dotted lines, Fig. 2,) that enters a hole in and drives the spool in the usual manner. The spindle $d$, below the bolster-rail $b$, has fast upon it a collar or shoulder, $d'$, immediately below which is a whirl, $d^2$, placed loosely thereon, the said whirl receiving the usual driving-band, (not necessary to be herein shown,) by which the whirl will be rotated. Below the whirl $d^2$ is a clutch, $e$, herein shown as having an annular groove, $e'$. The clutch $e$ has a hollow hub, which receives a strong spiral spring, $f$, surrounding the spindle $d$, and the lower end of the said spring is connected with and supported by a collar, $f'$, attached to the spindle. The clutch has a vertical groove, $g$, (see right of Fig. 2,) into which enters a pin, $g'$, of the collar $f'$, so that the said clutch is permitted to move longitudinally upon but cannot rotate independently of the spindle. If desired, and as preferably will be the case, I employ a friction-disk, $d^3$, of leather or other usual material between the upper side of the clutch and the under side of the loose whirl. The spring $f$ acts upon the clutch in such manner as to cause it to normally exert sufficient force upward against the whirl $d^2$ to cause the whirl, loose on the spindle and continuously driven by any usual band, to carry the clutch and spindle with it; but when pressure is applied to the said clutch $e$ in excess of the pressure between it and the whirl, as is the case when the brake is applied through the breaking of a thread, then the whirl continues to turn, but the spindle remains stationary. The extent of upward movement of the whirl is determined by the collar or shoulder $d'$.

When the spooling operation is going on correctly, the eyes 5 of the drop-levers $k'$, pivoted at $k$ on a bracket, $h$, fastened to the bolster-rail by screws $h'$, are suspended by the threads $n$, which are passing to the spool $c$, the said threads resting on the bars $h^3 h^5$ of the thread-rest $h^2$. (Shown as attached to the bolster-rail by the screws $h'$.) The pivot $k$ also supports the latch-lever $k^3$, weighted at its rear end, and having a toe, 10, (see Fig. 4,) to engage a projection, 4, on an arm, $m^2$, of the oscillating brake $m$. The front end of the latch-lever is beveled, as shown at 12, and carries a finger, $k^4$, which is extended laterally therefrom under the drop-levers $k'$, so that either one of them, on the breakage of a thread supporting its front end, will drop on the said finger and cause the latch-lever to be turned, lifting its other end, 10, from engagement with the projection 4 of the arm $m^2$ of the brake $m$, permitting the latter to turn under the action of the spiral spring $n^2$ within its hollow hub, and cause the shoe $m^3$ of the said brake to enter the annular groove in the hub of the clutch, and so engage the clutch $e$ as to stop the same and the spindle, while the whirl continues to run. The hollow hub of the brake $m$ is placed upon a stud or foot, $m^4$, depending from the bracket $h$, and the spring $n^2$, fastened at one end to the said stud, has its other end placed in a slot, $n^3$, of the said hub. The shoe $m^3$ of the brake has its face 6 curved or concaved in an arc differing from that of the clutch, and it is made wedge-like in cross-section, and its center of motion on the stud $m^4$ and that of the clutch are so located with relation to each other and with the line of contact that when said curved edge of the brake-shoe is thrown into the groove $e'$ of the clutch the latter will be locked and restrained from rotation. By this movement of the brake-shoe the arm $m^2$ of the brake $m$ is carried under the front end of the latch-lever $k^3$ far enough for the incline 2 on the said arm to meet the incline 12 at the front end of the latch-lever, thus lifting the latter, so that its finger $k^4$ acts upon and automatically lifts the drop-levers, placing their eyes 5 above the thread-supporting rods, and a little higher than shown in Figs. 1 and 2, holding them elevated while the operator ties or pieces the threads $n$, which is a matter of great convenience and saves much time and trouble. The threads having been pieced or tied, the operator will engage the handle $n^4$, turn the brake in the direction of the arrow 8, Fig. 1, remove the shoe $m^3$ from the pulley $e$, and during such movement the incline 3 of the arm $m^2$ will act upon the rear end of the latch-lever $k^3$ and lift it a little, causing the front end of the said lever to descend and the finger $k^4$ to be lowered from contact with the drop-levers $k'$, so that the latter may be again suspended by the threads $n$, and as soon as the projection 4 passes beyond the toe 10 at the weighted end of the latch-lever $k^3$ the latter, by its own gravity, will drop, engage the said projection, and hold the shoe $m^3$ of the brake out of contact from the clutch $e$, so that the latter, owing to its pressure against the whirl or against a leather or other washer, $d^2$, between them, as described, will be again carried by the whirl, taking with it the spindle, and the winding will be again commenced.

The brake has a handle, $n^4$, by which the operator may turn the same by hand when it is desired to release the shoe of brake from the clutch, and turn the brake in the direction of the arrow 8 far enough to carry the projection 4 of the arm $m^2$ past the lower end of the latch-lever $k^3$ in order that the said projection acting upon the latch-lever may hold it in the position Fig. 1, the spring $n^2$ being then under its greatest tension and ready to move the brake in the direction opposite the arrow 8, to throw the brake-shoe $m^3$ into the groove $e'$ of the clutch whenever the latch $k^3$ shall be turned upon its pivot far enough to release its rear end from the projection 4. As the spring $n^2$ moves the arm $m^2$ in the direction of the arrow, Fig. 5, the beveled end 2 thereof acts upon the beveled front or right-hand end 12 of the latch-lever $k^3$, (see Fig. 1,) and lifts that end of the said lever, causing its finger $k^4$ to act upon and lift the drop-levers so that their eyes will be placed above the bars $h^3$ $h^5$, in order that the eyes may be readily threaded. As soon as the thread has been pieced, the operator will engage the handle $n^4$ and turn it and the brake and its attached latch holding and moving arm in the direction of the arrow 8, Fig. 1, far enough to carry the projection 4 past the lower weighted end of the latch-lever $k^3$, when the end of the said lever will again act to hold the brake in the positions Figs. 1 and 2.

In Fig. 3 I have shown that part of the bolster $b'$ which is immediately above the bolster-rail $b$ as provided with an oil-hole, $c^4$.

I claim—

1. A spooler-spindle, a loose whirl thereon adapted to be driven continuously by a band, an opposed clutch, $e$, provided with a groove, $e'$, and a spring to force the clutch and whirl together, a drop-lever, and the oscillating brake provided with a shoe, $m^3$, and with a projection, 4, and a spring to move the brake, combined with a latch-lever which is adapted to hold the brake with its shoe away from the clutch, and to be acted upon by a drop-lever after the breaking of a thread to turn the latch-lever and release the brake, substantially as described.

2. The spooler-spindle, its loose whirl, the clutch and spring to press it into engagement with the said whirl, the drop-wires, and latch-lever, combined with the oscillating brake provided with an arm to act upon the latch-lever and move it to lift the drop-lever after the breakage of a thread, as described, and with a spring to move the brake whenever the latter is released from the latch-lever by the falling of a drop-lever, substantially as and for the purpose set forth.

3. The spooler-spindle, its loose band-receiving whirl, grooved clutch connected with the spindle, a drop-lever, and a latch actuated by the drop-lever after the breaking of a thread, combined with an oscillating brake interposed between the said latch-lever and clutch, one part of the said brake being adapted to engage the said clutch, another part of the said brake being adapted to be engaged and held by the said latch, substantially as described.

4. The spindle $d$, its collar or shoulder, the loose whirl, and clutch, the brake provided with a shoe, and a projection, 4, means to move the brake and drop levers or wires, and a rest or support for the threads, combined with a latch-lever, one end of which engages and holds the brake with its shoe away from the clutch, while the other end of the said lever is adapted to be struck and moved at the descent of a drop-lever, substantially as described.

5. The thread rest or support, the drop-levers or wires, the brake $n^3$, provided with the arm $m^2$ and shoe, and the latch-lever provided with the finger $k^4$, combined with the clutch, the spindle upon which it is secured, and the loose whirl, and means to hold the same in opposition to the pressure of the clutch against it, substantially as described.

6. The thread rest or support, the drop levers or wires, the brake $n^3$, provided with the shoe and the arm, having an incline, 3, and projection 4, and handle combined with the pivoted latch-lever adapted to be operated by the drop-levers, substantially as and for the purpose described.

In testimony whereof I have signed my name to this specification in the presence of two subscribing witnesses.

JAMES H. NORTHROP.

Witnesses:
 WM. J. WOODS,
 F. J. DUTCHER.